(12) United States Patent
Durand et al.

(10) Patent No.: US 6,272,467 B1
(45) Date of Patent: *Aug. 7, 2001

(54) SYSTEM FOR DATA COLLECTION AND MATCHING COMPATIBLE PROFILES

(75) Inventors: Pierre E. Durand, Chicago; Michael D. Low, Evanston; Melissa K. Stoller, Kenilworth, all of IL (US)

(73) Assignee: Spark Network Services, Inc., Evanston, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/784,713

(22) Filed: Jan. 16, 1997

Related U.S. Application Data

(60) Provisional application No. 60/024,789, filed on Sep. 9, 1996, now abandoned.

(51) Int. Cl.[7] ................................................. G06F 15/38
(52) U.S. Cl. ........................... 705/1; 705/5; 705/26
(58) Field of Search ............................... 705/1, 26; 707/5

(56) References Cited

U.S. PATENT DOCUMENTS

| | | | |
|---|---|---|---|
| 4,348,744 | 9/1982 | White . | |
| 4,422,158 | 12/1983 | Galie | 707/5 |
| 5,086,394 | 2/1992 | Shapira | 705/1 |
| 5,122,952 | 6/1992 | Minkus | 705/26 |
| 5,128,871 | 7/1992 | Schmitz | 364/490 |
| 5,164,897 | 11/1992 | Clark et al. | 705/1 |
| 5,251,131 | 10/1993 | Masand et al. | 704/9 |
| 5,325,475 | 6/1994 | Poggio et al. | 395/133 |
| 5,446,686 | 8/1995 | Bosnyak et al. | 365/49 |
| 5,450,504 | 9/1995 | Calia | 382/118 |

*Primary Examiner*—Allen R. MacDonald
*Assistant Examiner*—Jagdish Patel
(74) *Attorney, Agent, or Firm*—Robert P. Lenart; Eckert Seamans Cherin & Mellott, LLC

(57) ABSTRACT

This invention relates to an automated method for identifying matches between a set of predetermined traits and a set of preferences. This method can be used to find compatible matches in a variety of situation s where participants are identified by a profile of traits and a set of criteria desired in at match, including, for example, matching candidates to residency program, and matching job hunters with employment opportunities. The present invention offers advantages and improvements over prior computer matching systems because, it provides an automated, effective method for matching traits with corresponding preferences and insures that only matches of the highest degree are made. The, present invention utilizes two-way matching of selected criteria, which measures not only how compatible the potential match is with the desired traits of the user, but also how well the user fits the potential match's idea of the perfect match.

25 Claims, 8 Drawing Sheets

| TRAIT PROFILE | 17 |
|---|---|

| | |
|---|---|
| AGE | 20 |
| GENDER | 21 |
| WEIGHT | 22 |
| HEIGHT | 23 |
| WHETHER_HAVE_CHILDREN | 24 |
| ETHNICITY | 25 |
| MARITAL_STATUS | 26 |
| LOCATION_OF_RESIDENCE | 27 |
| WHETHER_GOOD_LOOKING | 28 |
| EDUCATION_LEVEL | 29 |
| WHETHER_SMOKER | 30 |
| TYPE_OF_ACTIVITY_LIKED | 31 |
| TYPE_OF_RELATIONSHIP_DESIRED | 32 |

*FIG. 3a*

| PREFERENCE PROFILE | 18 |
|---|---|

| | |
|---|---|
| SEXUAL_PREFERENCE | 33 |
| MAXIMUM_AGE | 34 |
| MINIMUM_AGE | 35 |
| DESIRED_BUILD | 36 |
| ETHNICITY_PREFERENCE | 37 |
| CHILDREN_PREFERENCE | 38 |
| SMOKING_PREFERENCE | 39 |

*FIG. 3b*

SYSTEM FOR DATA COLLECTION AND MATCHING COMPATIBLE PROFILES

This application claims the benefit of U.S. provision application Ser. No. 60/024,789 filed Sep. 9, 1996, now abandoned.

FIELD OF THE INVENTION

This invention relates to an automated method for identifying matches between a set of predetermined traits and a set of preferences. This method can be used to find compatible matches in a variety of situations where participants are identified by a profile of traits and a set of criteria desired in a match, including, for example, matching candidates to residency programs, and matching job hunters with employment opportunities. In the embodiment described below, the method of the invention is discussed for selecting potential dating partners based on personal traits and compatibility criteria.

BACKGROUND OF THE INVENTION

Traditionally, many personal relationships and marriages were arranged by families. In addition, the intimacy of small town communities provided many chances for couples to meet, get to know each other, and form relationships. However, as the pace of life has accelerated, and as populations have become more urbanized, people have found that their lifestyles and schedules provide them with fewer opportunities to meet potential partners with whom to form relationships. Consequently, many people have turned to less traditional means of finding potential mates.

For example, people seeking dates have used personal ads as a means to meet others with similar interests. In these ads, the person seeking a match provides information about his or her own personality traits and about the traits he or she desires in others. With the exception of a few items, such as sex, race, and age, however, there is little uniformity in the information included in these ads. Because the persons placing these ads could only predict the types of information that a reader would want in deciding whether to arrange to meet, many of these ads failed to produce successful matches. The lack of uniformity, and the unorganized nature of classified ads, also requires the reader to expend extensive amounts of time sorting through the ads to find a potential match. There is no quick way for the reader to quickly scan through these ads to eliminate those persons who possess unacceptable traits. Moreover, the lack of uniformity in the ads may prevent a reader from obtaining information about a trait that the reader deemed to be essential in a potential mate.

Computer dating services provided a more organized method of classifying users, and of providing a way to quickly screen candidates. Those services, however, still failed to provide adequate compatible matches in many cases. Detailed information about the operation of such dating systems is not generally available, however, it is believed that most computer dating systems fall into two basic types: (1) linear matching; and (2) one-way compatibility screening.

In the first type of dating service, the person seeking a date is asked to answer a questionnaire and characterize himself or herself according to a limited set of criteria. These criteria usually include physical characteristics such as age, weight, race, and marital status, along with psychological characteristics such as extroversion/introversion. After entering this data into the computer, the computer dating service compares this new data to that already contained in the questionnaires filled out by other subscribers to find those that have similar characteristics. This similar/non-similar type of matching fails to take into account the fact that persons may place different emphasis on a trait in others than on a trait that they themselves exhibit. Moreover, this type of matching fails to account for the fact that males and females place significantly different emphasis on the weighting of factors and also have significantly different tolerances for variability in factors.

The second type of traditional dating service solves some but not all of these problems. Such a service asks the user to fill out not just one questionnaire about their own traits, but also another questionnaire indicating the characteristics desired in a potential match. The dating service then uses the criteria specified in the second questionnaire to search through the pool of users and find potential matches. While such a method accounts for the individual desires of the person seeking a match, it fails to account for how desirable the match would find the user. Thus, while the potential match may fit the criteria of the person seeking the match, there is no attempt to determine whether the match will find the other person compatible (i.e., a two-way match). Under such a system, for example, a user who did not want to date potential matches with children would never receive a match with children, however, this same user could be used as a match for someone with children, thus resulting in an incompatible pairing.

Prior computer dating systems thus have failed to employ two-way matching and to utilize a numerical method of evaluating potential matches instead of a similar/not-similar approach. Those systems have also failed to provide an efficient method to eliminate unduly restrictive or irrational matching criteria and to adjust for gender and generational differences among users. Finally, existing computer dating systems have failed to account for the problem of users who infrequently use the system and are therefore unlikely to respond if used as matches for other users.

Many of the same problems arise in compatibility screening situations outside the field of computer dating. The unorganized and non-uniform nature of ads is not limited to personal ads but is indicative of most classified ads. Thus, persons trying to match their qualifications to an employer's job criteria have faced many of the same problems. Likewise, job search firms that utilize automated screening methods have not employed numerical methods of comparing matching candidates to prospective opportunities and have failed to implement systems to adjust the matching criteria so as to maximize the likelihood of finding a compatible match. Moreover, these firms have not utilized two-way matching of relevant characteristics. Thus, for example, these systems attempt to find a job candidate based on an employer's criteria without considering the desirability of the job or opportunity from the employee's view.

SUMMARY OF THE INVENTION

The present invention offers advantages and improvements over prior computer matching systems because it provides an automated, effective method for matching traits with corresponding preferences and insures that only matches of the highest degree of compatibility are made. The invention improves upon older systems by greatly increasing the level of match compatibility and insuring that a user has a greater chance of finding a match that meets his or her desired characteristics. The present invention utilizes two-way matching of selected criteria, which measures not only how compatible the potential match is with the desired traits of the user, but also how well the user fits the potential match's idea of the perfect match. One embodiment of the invention further refines the matching process by asking the user to identify and rank which criteria the user considers to be the most important in a match and then weighing those criteria more heavily in the matching process.

The invention also uses behavioral science and artificial intelligence principles to adjust matching criteria to provide for more realistic matches. For example, many dating systems ask the user to specify the maximum weight of a potential match. However, many men fail to take into account a woman's height in selecting this ideal weight. As a result, traditional systems will generate a low number of matches for some users. To address this problem, the invention uses "build," rather than weight, as a matching criterion, relying upon actuarial obesity tables to convert the height and weight entered by the user into a "build" variable that can be compared with the desired build entered by the user. The use of the build variable increases the number of compatible matches and removes the discriminatory effect against taller women found in other dating systems. This ability of the invention to generate derivative variables based on other traits or criteria has application outside the example above and can be used in other situations so as to remove or mitigate a bias or constraint and increase the compatibility of matches.

Many users of dating services do not make rational choices for their ideal match given their own profile. For example, an overweight, older man may specify that he only wishes to date very thin women between 26 and 28 years old, which likely would result in few matches because the user's criteria are too restrictive. The invention therefore adjusts the criteria for the user's desired match in several respects. First, the invention adjusts the desired build of a potential match based on the user's own build. Thus, if the user was determined to have an XX-full build type (based on his height and the number of pounds he weighs), the method of the invention would open up the build criteria to include women of thin, medium or large builds. Second, the system adjusts the age range entered by the user by approximately 15% of the user's own age, thereby increasing the number of women who may qualify as matches. A person skilled in the art will realize that other criteria can be adjusted much in the same manner by taking into account the user's own characteristics so as to maximize the likelihood of finding a compatible match.

The invention also accommodates generational and gender bas;ed preferences in its users. For example, for heterosexual female users, the method of the invention adjusts the compatibility score for potential matches based on the difference between the height of the male match and the female user and whether the male match has a higher education level than the female user. Known likely demographic or psychographic variations from a user's preferences thereby may be used in matching to maximize the likelihood of a successful outcome.

The invention also maintains information about each user's use of the system and the types of persons in which the user expresses interest. The invention then provides bonuses and penalties based on this participation pattern in determining future potential matches. By tracking such information, the system eliminates the problem caused by a match with a person who is not an active user of the system, and therefore is unlikely to respond if used as a match. If a user has not called within a specific period of time, e.g., 7 days, the system stops using that person as a match for other users. Second, the method of the invention increases the compatibility score of a potential match who has been active in using the system by sending and listening to messages from other users. Third, the system will adapt the criteria of the user's desired match based on the criteria of matches in which the user has expressed interest. The method of the invention thus rewards user activity and insures that more compatible matches will be made.

The method of the invention includes the step of first gathering information about a profile of traits (the trait profile) and then gathering information about the preferences for a match (the preference profile). Both of these profiles are stored in a database along with a plurality of similar records gathered from other users of the invention.

The method of the invention collects and analyzes a plurality of individual traits in the trait profile. In the preferred embodiment, over 13 individual criteria are collected to insure compatibility, including gender, location, weight, height, age, education, marital status, appearance, whether the user smokes, the user's ethnicity, whether the user has children, what type of activity the user likes, and what type of relationship the user is seeking. The invention also collects information in the user's preference profile concerning the user's basic criteria for a match. In the preferred embodiment, these criteria comprise the user's desired sexual preference, maximum and minimum age, and preferences for smoking, build, children and ethnicity. One embodiment of the invention further asks the user to rank how important he or she considers these preferences in determining a match and utilizes this information to accord highly ranked preferences more weight in the matching process.

The method of the invention first computes a set of basic constraint criteria based on both the user's and the potential match's preference profile which are used to eliminate those users who clearly are not suitable. The remaining potential matches then are evaluated numerically by computing a base compatibility score for each potential match. In the preferred embodiment, this compatibility score is a numerical index based on the difference between the location of the user and the potential match, how closely the potential match is to the user's desired age, and how closely the build of the user and potential match fit each others' desires. The base compatibility score is then adjusted by a system of bonuses and penalties, including selected two-way matching of the personal and preference profiles of both the user and potential match. This adjusted compatibility score must exceed a minimum threshold before it is added to the list of acceptable matches. The method of the invention then sorts and ranks the list of acceptable matches so that those with the highest adjusted compatibility score are provided to the user.

Upon contacting the system embodying the invention, a user sequentially retrieves the acceptable matches generated by the method of the invention and, after reviewing the trait profile of a match, is presented with the option to leave a voicemail message for the match to arrange for further contact. The user may also listen to any voicemail messages he or she has received from others for whom she has been used as a match.

It is an object of the invention to utilize two-way matching methods to take into account not only how compatible the potential match is with the preference profile, but also how well the user fits the potential match's idea of the perfect match.

It is another object of the invention to provide a matching system which not only screens potential matches based on constraint criteria but which also computes a compatibility score for each potential match based on a series of bonuses and penalties and provides only the highest scoring matches to the user.

Still another object of the invention is to utilize behavioral science principles to eliminate irrational or unduly restrictive matching criteria in the preference profile and adjust these criteria so as to provide the maximum number of potential compatible matches.

Another object of the invention is to utilize the user status of each user in determining matches so as to discourage and/or prevent matches with users who only infrequently utilize the system and are therefore unlikely to respond, and to encourage matches with active users and thus increase the chances that a relationship will be formed.

It is yet another object of the invention to adjust the matching criteria in the preference profile to adjust for generational and gender preferences and therefore insure that only the most compatible matches are made.

Still another object of the invention is to adjust the matching criteria in the preference profile according to the trait profile of prior matches which have been found acceptable and therefore adjust the preference profile by the actual traits of the matches already found desirable.

It is still another object of the invention to adjust the compatibility score based on the rank which a user has assigned to his or her preferences so as to give more weight to those characteristics which the user considers most important.

The manner in which the present invention accomplishes these objectives will be made clear by a discussion of a specific embodiment of the invention below.

BRIEF DESCRIPTION OF THE DRAWINGS

FIG. 3a is a listing of the fields contained in a trait profile record in the preferred embodiment.

FIG. 3b is a listing of the fields contained in a preference profile record in the preferred embodiment.

DETAILED DESCRIPTION OF A PREFERRED EMBODIMENT

Figure 1:
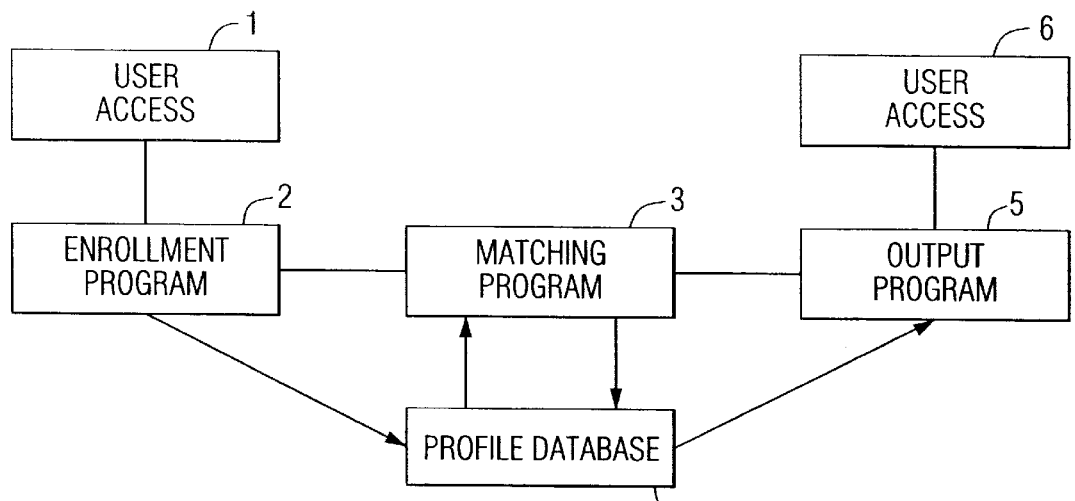
FIG. 1 is a high-level block diagram of an embodiment o f the invention.

FIG. 1 is a high-level block diagram of an embodiment of the invention. For purposes of explaining the invention, the invention will be described as it is embodied in a system used for providing computer dating and matching services using touch-tone telephones. It will be readily understood by those skilled in the art, however, that the invention is not so limited, but may be used to provide compatibility matching services using other access methods and in other fields such as matching candidates with residency programs or employment or other opportunities.

In the preferred embodiment of the invention, the enrollment program 2, matching program 3, profile database file 4, and output program 5 are implemented to run on a personal computer using the OS/2 operating system from International Business Machines, Inc., of White Plains, N.Y. . While the invention may be implemented using a wide variety of computer systems, which may be programmed using a wide variety of existing programming languages and database programs, one embodiment of the invention was implemented in ProC, a version of the C programming language available from Oracle Systems of Redwood City, Calif., and using a known relational database product commercially marketed by Oracle that is accessed using embedded SQL commands in the ProC language. The software embodying the method is transportable to other computer systems, such as personal computers, mainframes, and mini-computers.

In the embodiment of the invention shown in FIG. 1, the invention is comprised of three basic elements. User access 1, 6 is accomplished through a telecommunications system connected to a telephone line through which the user inputs data using a numeric keypad on a touch-tone telephone. In the enrollment program 2, as more fully described below, the user is prompted to select options corresponding to the user's personal traits and the traits he or she desires in a match. These options are recorded by the computer and stored in the caller's profile record 16 in the profile database 4. As more fully discussed below, the matching program 3 uses a series of procedures to match the user's profile record 16 with a plurality of other compatible profile records 16 in the profile database. A list of the acceptable matches made by the matching program 3 also is stored in the user's profile record 16 in the profile database 4. In the output program 5, as more fully described below, the user is presented with a series of recorded prompts that provide the user with the trait profile 17 and recorded outgoing message 15 of the matches made by the matching program 3 and linked to the user's profile record 16.

Figure 2:
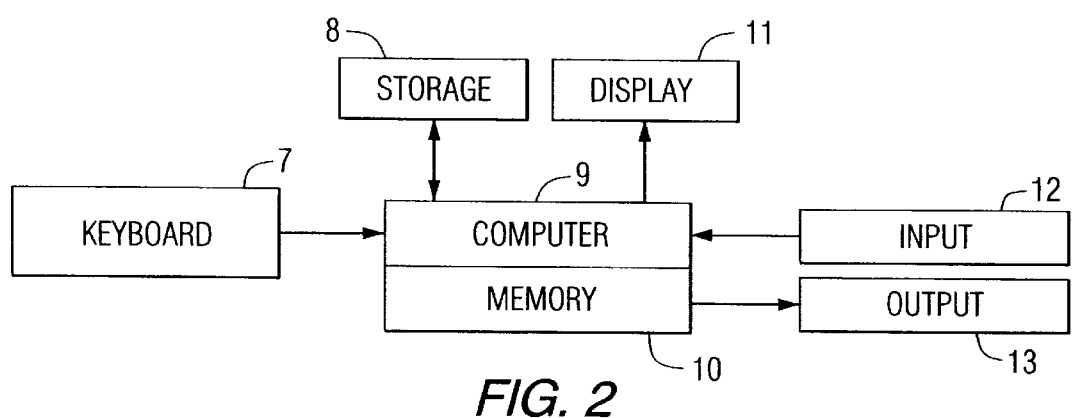
FIG. 2 shows a typical apparatus that is used to implement the invention.

FIG. 2 shows a typical apparatus that is used to implement the invention. Such apparatus preferably includes an input means 12 for collecting the personal profiles 17 and preference profiles 18 from users, storage means 8 for storing such information, and an output means 13 by which the resulting matches can b e reported to a user. User access 1 is accomplished by the input means 12. User access 6 is accomplished by the output means 13. In the preferred embodiment such input means 12 comprises a telecommunications system which the user contacts by dialing a telephone number and which accepts information input by the user using the numeric keypad of a touch-one telephone. The output means 13 comprises a similar telecommunication system which, through a series of recorded messages, presents the user with the personal information and outgoing message 15 of the matches made for the user by the matching program 3. The display 11 and keyboard 7 provide the operator of the invention with the ability to conduct administrative and customer relations functions on the profile database 4 and to generate reports (not shown).

Figure 3:
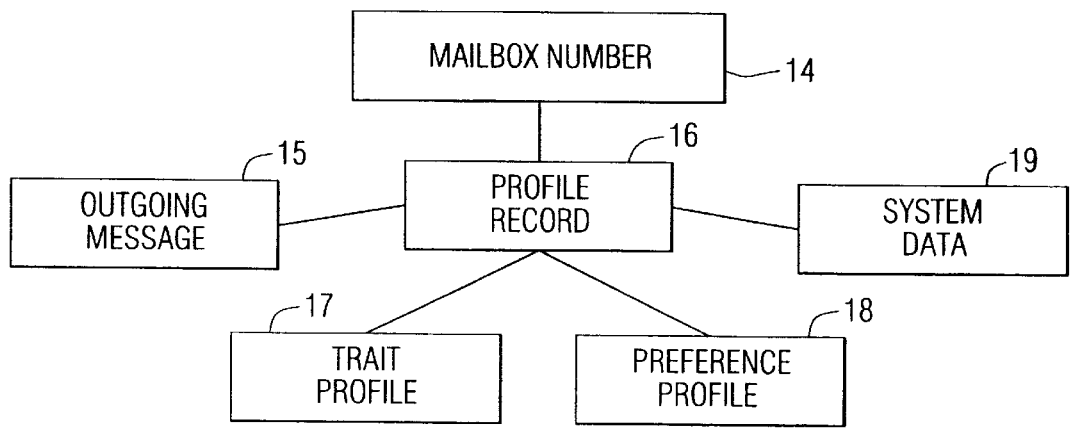
FIG. 3 is a functional diagram of a profile record stored in the profile database.

FIG. 3 is a functional diagram of a profile record 16 stored in the profile database 4. Each profile record 16 is identified by a unique mailbox number 14 assigned by the enrollment program 2 when a new user is entered into the system. The profile record 16 is composed of three sub-records. The trait profile sub-record 17 contains information about the user's traits and characteristics which are stored in fields for gender, age, weight, height, etc. A listing of the fields contained in a trait profile 17 in one embodiment is indicated in FIG. 3*a*. The codes stored in these fields correspond to the option selected by the user during enrollment and are indicated in Table 3a.

TABLE 3A

| Personal Profile Fields | Possible Values |
| --- | --- |
| Age | (Numeric) |
| Gender | 1 = Male |
| | 2 = Female |
| Weight | (Numeric) |
| Height | (Numeric) |
| Whether_Have_Children | 1 = Has_Children |
| | 2 No_Children |
| | 3 = No_Children_Will_Tolerate_Match_With_Children |
| Ethnicity | 1 = White |
| | 2 = Black |
| | 3 = Hispanic |
| | 4 = Asian |
| | 5 = Other |
| Marital _Status | 1 = Single |
| | 2 = Separated/Divorced |
| | 3 = Widowed |
| Location_of_Residence | (1–6) |
| Whether_Good_Looking | 1 = Good_Looking |
| | 2 = Average |
| Education_Level | 1 = Graduate |
| | 2 = College |
| | 3 = Some_College |
| | 4 = High_School |
| Whether_Smoke | 1 = Smoker |
| | 2 = Non_Smoker |
| | 3 = Non_Smoker_That_Tolerates_Smokers |
| Type_of_Activity_Liked | 1 = Dance_Club |
| | 2 = Dinner_and_Movie |
| | 3 = Country_Concert |
| | 4 = Sporting_Event |
| | 5 = Casual |
| Type_of_Relationship_Desired | 1 = Casual |
| | 2 = Maybe_Something_Serious |
| | 3 = Commitment |

The preference profile sub-record 18 contains information about the traits and characteristics that the user desires to find in a match, such as the desired gender of a potential match, maximum age of a potential match, etc. A list of the fields contained in a preference profile 18 in the embodiment shown in the drawings is indicated in FIG. 3*b*. One embodiment of the invention further contains information about how important the user has ranked these preferences in determining a match (not shown). The codes stored in these fields correspond to the option selected by the user during enrollment and are indicated in Table 3b.

TABLE 3B

| Preference Profile Fields | Possible Values |
| --- | --- |
| Sexual_Preference | 0 = Heterosexual_Male |
| | 1 = Gay_Male |
| | 2 = Bi_Male |
| | 3 = Heterosexual_Female |
| | 4 = Gay_Female |
| | 5 = Bi_Female |

TABLE 3B-continued

| Preference Profile Fields | Possible Values |
| --- | --- |
| Maximum_Age | (Numeric) |
| Minimum_Age | (Numeric) |
| Desired_Build | 1 = Small |
| | 2 = Medium |
| | 3 = Full |
| Ethnicity_Preference | 1 = Same_Ethnicity |
| | 2 = Don't_Care |
| Children_Preference | 1 = Children_OK |
| | 2 = Prefer_No_Children |
| | 3 = Will_Not_Date-User_With_Children |
| Smoking_Preference | 1 = Smoker |
| | 2 = Non_Smoker_Will_Date_Smoker |
| | 3 = Non_Smoker_Will_Not_Date_Smoker |

Figure 3C:
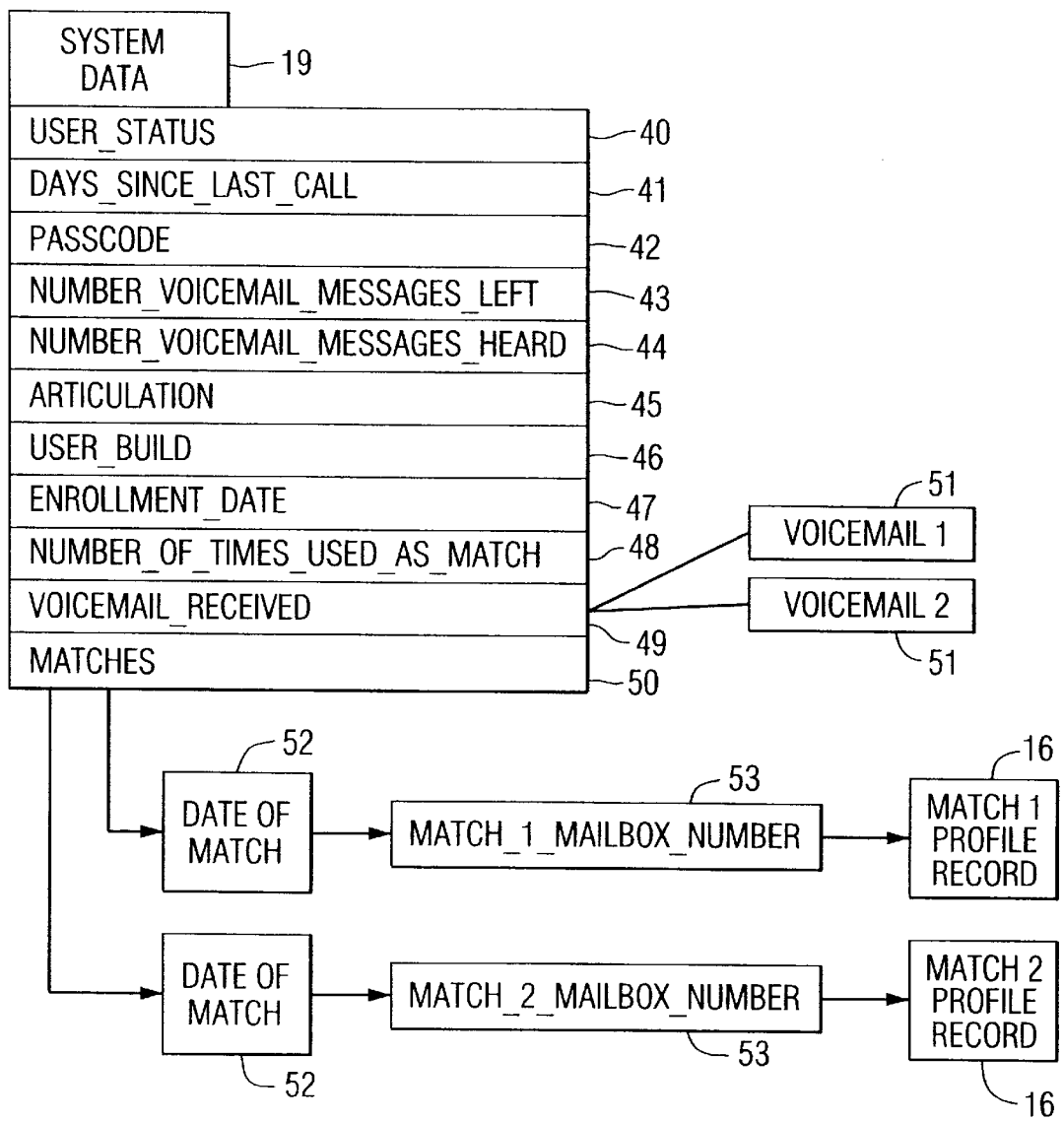
FIG. 3c is a listing of the fields contained in the system delta sub-record of a profile record in the preferred embodiment.

The system data sub-record 19 contains information relating to the user's use of the system and contains links to the matches 50 and voicemail 51 received by the user. A listing of the fields contained in the system data 19 sub-record in the preferred embodiment is set forth in FIG. 3*c*.

I. Enrollment Program

Figure 4:
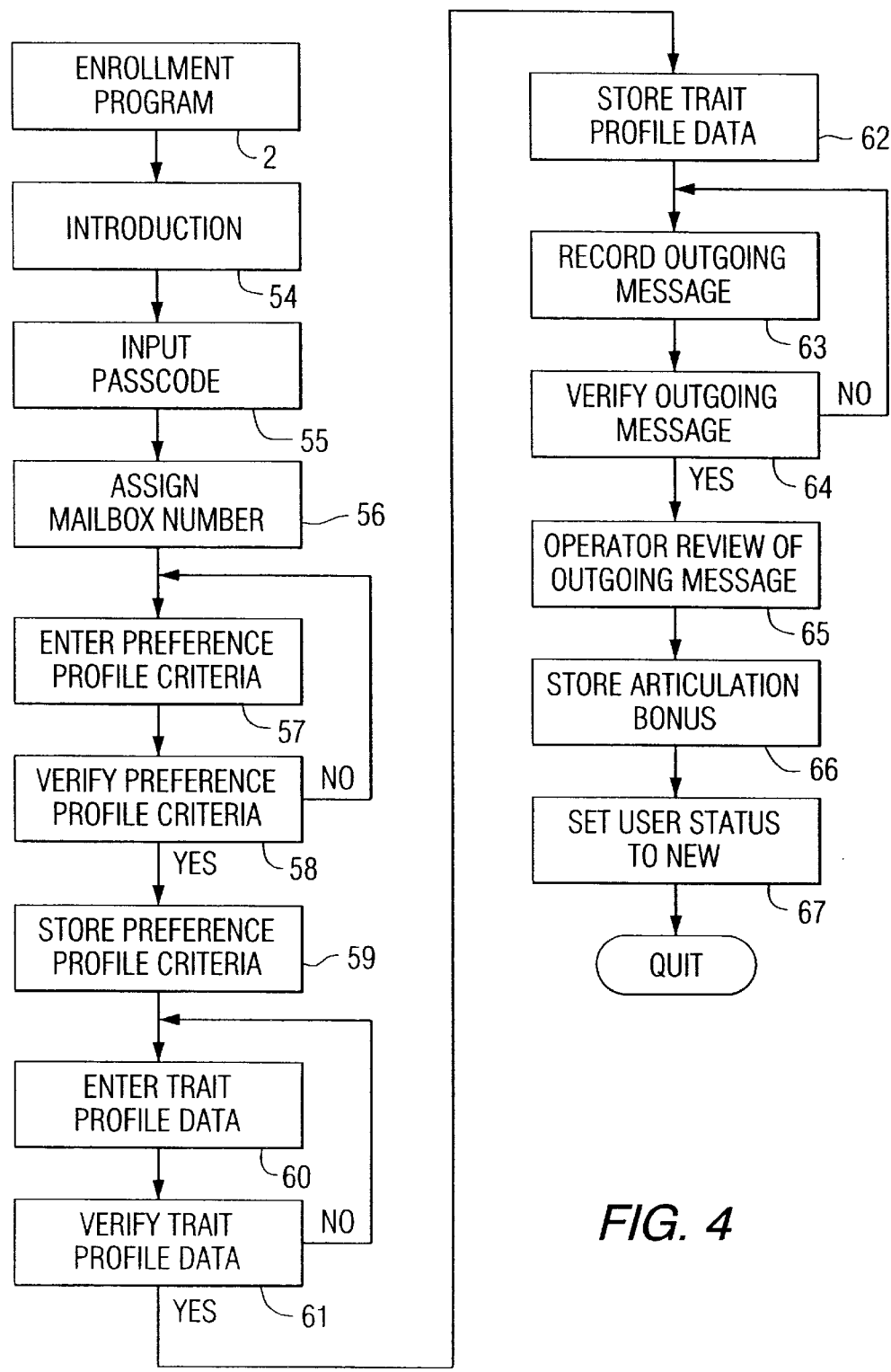
FIG. 4 is a flow chart of the enrollment program of the preferred embodiment of the invention.

FIG. 4 is a high level flow chart of the enrollment program 2 of the preferred embodiment, through which the general operation and method of the invention in the enrollment program 2 will be explained. In general, the user initiates a call to a designated telephone number associated with enrollment in the matching service through the input means 12. Upon connecting with the system, the new caller is presented with an introduction script at step 54 explaining the service and the method by which information will be collected from the user. After this introduction, the user is asked at step 55 to enter a six-digit passcode 42 that will be used to verify the user's identity in future sessions with the system of the invention. In the preferred embodiment, this passcode 42 is composed of the last four digits of the user's telephone number and an additional two digits selected by the user. The enrollment program 2 creates a new profile record 16 for the new user and assigns that profile record 16 a new mailbox number 14 at step 56. The user's passcode 42 is stored in the system data 19 in the user's profile record 16.

At step 57 the enrollment program 2 requests the user to input data for each field (33–39) identified in the user's preference profile 18. The user is presented with a series of pre-recorded scripts asking the user to select the option, from a finite list of options presented, representing the characteristic that they desire in a potential match. For example, the user is first presented with a pre-recorded message asking the user to enter the gender of the person they desire to meet. The caller identifies the gender by pressing "1" for male and "2" for female. A list of the fields in the preference profile 18 and the possible selections for each field in the preferred embodiment is provided in Table 3b. In the preferred embodiment of the invention, the user selects the desired option by indicating his or her choice on the numeric keypad of a touch-tone telephone. After the user has entered a selection for each field of the preference profile 18, the enrollment program 2 reads back the information entered by the user and asks in step 58 that the user confirm that this information is correct. If the information is not correct, the enrollment program 2 asks the user to reenter the preference profile 18 information. Upon receiving confirmation that the information entered into the preference profile 18 is correct, at step 59 that information is stored in the fields of the preference profile 18 in the user's profile record 16.

At step 60 the enrollment process gathers information about the personal traits of the user for storage in the trait profile 17. The user is presented with a series of pre-recorded scripts asking the user to enter information about the user's own personality. The enrollment program 2 proceeds sequentially through each field (20–32) of the trait profile 17 and prompts the user to select the number corresponding with his or her characteristics. In the preferred Embodiment each of these characteristics is selected by entering the corresponding number on the numeric pad of the user's touch-tone telephone. The possible responses of the user in the preferred embodiment and their matching numeric codes are presented in Table 3a. After the user has entered a selection for each field of the trait profile 17, the enrollment program 2 reads back the information entered by the user at step 61 and asks the user to confirm that this information is correct. If the information is not correct the enrollment program 2 asks for re-entry of the trait profile 17 information. Upon receiving confirmation that the information entered into the trait profile 17 is correct, that information is stored in the fields of the trait profile 17 in the user's profile record 16 at step, 62.

The recorded prompts presented to the user during the enrollment process are store d digitally in the computer. These prompts are previously recorded by personnel and broken down into their corresponding phrases which are then pieced together to create successive paragraphs composing the script.

The user is presented at step 63 with the opportunity to record a message, called the "outgoing message 15" or OGM. In the preferred embodiment, the message is preferably 40 seconds in length, and may be as long as 2 minutes, and permits the user to provide additional information and details about the user's personality or the traits the user desires in a match. This message is stored digitally on the storage means 8 and is linked to the user's profile record 16. When a user is matched with others through the matching program 3, as described more fully below, the user is presented with the opportunity to review not only the trait profile 17 of the match, but also to listen to the match's outgoing message 15. The outgoing message 15 thus may provide additional information that the user may use to determine whether the match is compatible. After recording, the OGM 15 is replayed to the user and the user is asked to verify that the OGM is acceptable at step 64. After verification, the OGM 15 is stored in the storage device and linked to the user's profile record 16.

In one embodiment, upon enrollment of a new user, a human reviewer reviews the OGM of the new user at step 65 to ensure that it is appropriate. During this review process, the reviewer will score the new user's outgoing message 15 based on the user's articulation, diction and speech at step 66. The outgoing message 15 is assigned a code based on whether it is above average, normal, or inarticulate, and this articulation criteria is stored in the system data 19 of the user's profile record 16. This articulation criteria 45 is utilized by the matching program 3 in determining matches for the user at step 98. In general, a user who is inarticulate in his or her outgoing message 15 is penalized when used as a match for other users.

As each new user completes the enrollment process, his or her profile record 16 is added to the profile database 4. The profile database 4 thus contains a plurality of profile records 16 with one profile record 16 for each user.

Figure 5:
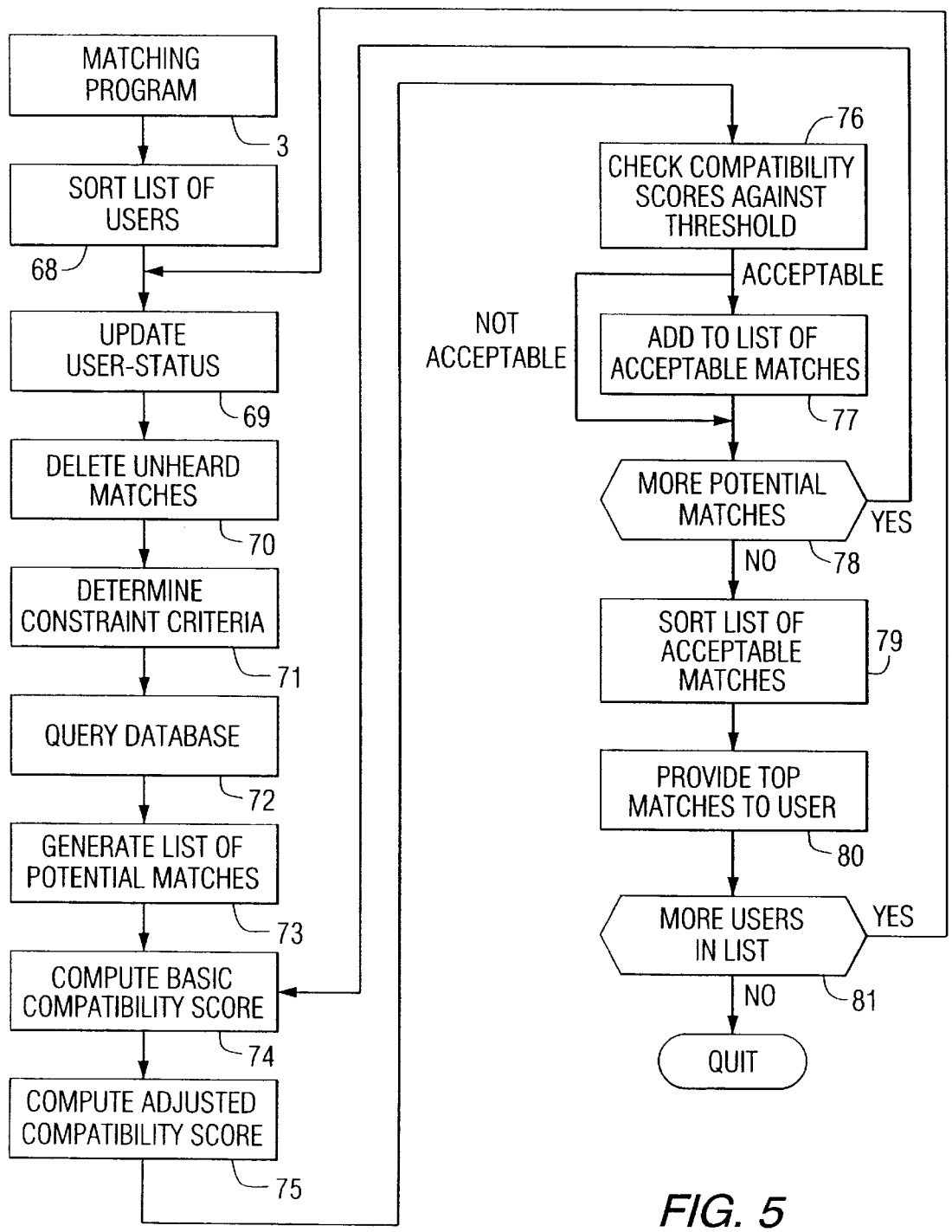
FIG. 5 is a f low chart of the matching program of the preferred embodiment of the invention.

II. Matching Program Upon execution, at step 68 the matching program 3 first sorts the profile record 16 of each user by the date of enrollment and creates a list of users with newer users first. This sorting process allows newer users to receive more desirable matches who may quickly be used as a match the maximum number of times permitted by the system. The matching program 3 then loops sequentially through this list of users starting with the newest users and calculates matches for each user as illustrated in FIG. 5 and more fully described below.

The system data 19 of the profile record 16 for each user maintains a "user_status" field 40 for each user to determine whether such user should be eligible to receive matches and to be used as a match for other users. The system data 19 of the profile record 16 for each user also contains a "days_since_last_call" field 41 which indicates the number of days since the user last called to check the status of their account and to review the matches that they had received. Upon beginning the matching process for each user, the matching program 3 checks at step 69 the number of days since the user's last call as indicated by the "days_since_last_call" field 41 in the system data 19 of the user's profile record 16. If the user has called within the last 14 days then the "user_status" field 40 of the system data 19 of the user's profile is si[] to "active," otherwise this value is set to "not_called" and no new matches are generated for tile user until the user calls again. Upon receiving "not_called" status, all of the users' unheard matches are deleted and the matching program 3 loops to the next user on the sorted list of users (not shown).

If the user has called within the 14-day period, the matching program 3 continues at step 69 to sort the user's unheard matches from newest to oldest using the "date_of_match" field 51 of each match. Unheard matches are defined as matches which have been assigned previously by the matching program 3 but which have not been retrieved by the user. After sorting the unheard matches, the program determines whether the user has more than 5 unheard matches from the last three days. If the user has 5 unheard matches, then the "user_status" field 40 of the user is set to "not_called" and no new matches are generated for that user until the user calls again. Upon receiving "not_called" status, all of the users' unheard matches are deleted and the matching program 3 loops to the next user on the sorted list of users (not shown). For those users not on "not called" status, the matching program 3 deletes at step 70 all the user's previously unheard matches to make way for the new matches.

Figure 5A:
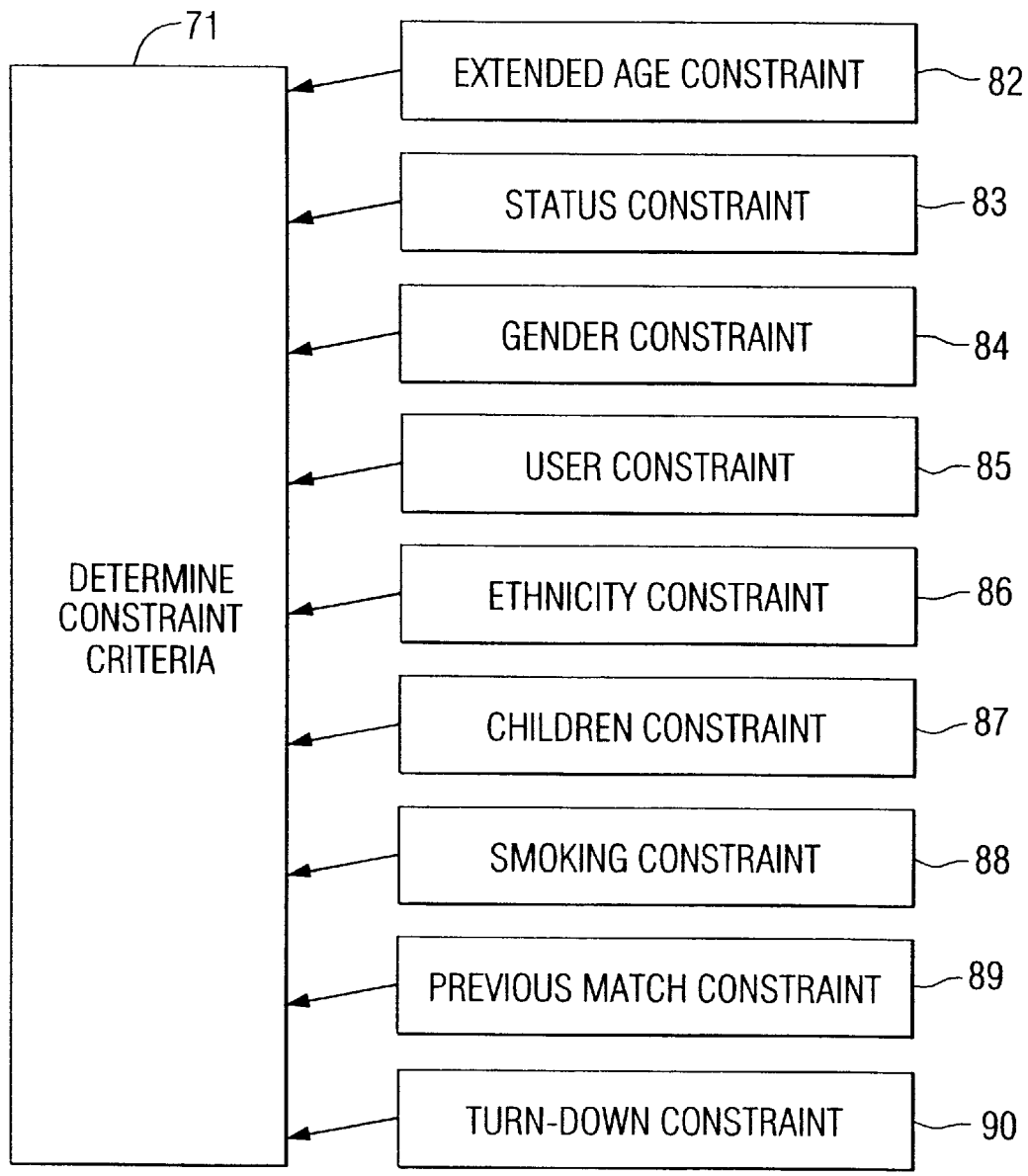
FIG. 5a is a schematic diagram of the constraint criteria determined in the preferred embodiment of the matching program.

The matching program 3 then goes on at step 71 to determine the constraint criteria that will be used to match the user with matches that meet their preference profile 18. FIG. 5a provides a detailed schematic diagram of the calculation of these criteria in one embodiment. If the gender field of the user's trait profile 17 indicates that the user is a male, the matching program 3 at step 82 calculates the age range of the user's desired match by finding the difference between the maximum age field and minimum age field contained in the user's preference profile 18. If this desired age range is unduly restrictive, in step 82 the matching program 3 adjusts the minimum age specified in the user's preference profile 18 on the assumption that heterosexual male users are willing to date younger women. Adjustment of the age range based on behavioral science principles permit the system to generate a larger number of potential matches that later are narrowed using the bonus and penalty system described below. An unduly restrictive age range is defined as a desired age range of less than 6 years for men 40 years and younger, or less than 10 years for a male user over 40. In such cases, the matching program 3 will adjust the minimum age field 35 of the user's preference profile 18 by the following formula:

$$\text{minimum\_age\_extended} = \text{minimum\_age} - (\text{minimum\_age}/10) - 1$$

where minimum_age is the value specified in the minimum age field 35 of the user's preference profile 18. Thus, for example, for a 28-year old user seeking a match with a minimum age of 24 and a maximum age of 28, the invention would adjust the minimum age of 24 by 10% of the user's age or 2 and subtract an additional 1 year thus reducing the minimum age to 21. For female users and male users who do not have unduly restrictive age ranges, minimum_age_extended is set to the value in the minimum age field 35 of the user's preference profile 18. It will be recognized by one skilled in the art that the maximum_age can be similarly extended.

A potential match is determined to exist for each profile record 16 whose personality record satisfies the constraint criteria generated by the matching program 3. The constraint criteria in one embodiment are set forth below:

(a) Extended Age Constraint 82—the value in the age field 20 of the potential matches' trait profile 17 must be greater than the minimum_age_extended value described above and less than the maximum age value 34 of the user's preference profile 18.

(b) Status Constraint 83—the value of the days_since_last_call field 41 in the potential match's system data 19 must be less than last 7 days.

(c) Gender Constraint 84—the value in the gender field 21 of the potential match's trait profile 17 must satisfy the gender specified in the sexual preference field 33 of the user's preference profile 18.

(d) User Constraint 85—the mailbox number 14 of the user must not be the same as the mailbox number 14 of the potential match because the user cannot be matched with himself or herself.

(e) Ethnicity Constraint 86—The invention performs a two-way check to insure that both parties have the same ethnicity or "don't care" about the other's ethnicity. If the ethnicity preference field 37 in both the user's and the potential match's preference profile 18 indicates that they both "don't_care" about the other's ethnicity then the matching program 3 skips this constraint. Otherwise, the value in the ethnicity field 25 of the user's trait profile 17 must match the value in the ethnicity field 25 of the potential match's trait profile 17.

(f) Children Constraint 87—if the children_preference field 38 of the user's preference profile 18 indicates that the user "will_not" date someone with children then the value of the whether_have_children field 24 in the potential match's trait profile 17 must not indicate that the potential match "has_children."

(g) Smoking Constraint 88—if the smoking preference field 39 of the user's preference profile 18 preference indicates that the user "will_not_date_smoker" then the value in the whether smoker field 30 of the potential match's trait profile 17 must indicate that the potential match is a "non_smoker".

(h) Previous Match Constraint 89—the previous matches 49 in the user's system data 19 must not indicate that the potential user was previously matched to the user and the user previously heard the match (i.e., the match was not deleted from the user's mailbox before the user heard the match).

(e) Turn-down Constraint 90—the number of times someone has been used as a match as indicated in that field 48 in the potential match's system data 19 must be less than a pre-set number in the database. This constraint prevents a potential match from being used as a match too often and thus reducing the opportunity for others to be used as matches.

It will be understood that a system designer may select different constraint criteria without deviating from the invention. Thus, for example, in matching potential employees with job opportunities, one constraint criteria would include whether the education level in the potential employee's trait profile 17 meets the "minimum_education_level" preference in the job's preference profile 18. A program for matching candidates to residency programs would similarly generate constraint criteria based on the residency program's preferences for "past_experience" and "education_level" and the candidate's traits.

Referring back to FIG. 5, upon determining the constraint criteria, the matching program 3 then queries the profile database 4 at step 72 using the constraint criteria. Matching is done through an embedded SQL command in the ProC programming language. The database query searches the plurality of profile records 16 in the profile database 4 looking for potential matches that satisfy all of the constraint criteria. If a profile record 16 matches all of the constraint criteria, it is added to a file of potential matches at step 73. Profile records 16 in the profile database 4 that do not meet one or more of the constraint criteria are not considered to be eligible to be matches for the user and are discarded.

Once the list of potential matches has been created at step 73, the preferred embodiment of the matching program 3 goes on further to create a numerical index of compatibility for each profile record 16 indicated on the list of potential matches in steps 74–75. This numerical index of compatibility is a composite measure of the degree of compatibility between the user's preference profile 18 and a potential match's trait profile 17, between the potential match's preference profile 18 and the user's trait profile 17, and between the user's and potential match's trait profiles 17. This method of two-way matching, by computing an index of compatibility based on both the desirability of the match from the point of view of the user and the desirability of the user from the point of view of the match, serves to insure that only the most compatible matches are made.

As more fully described below, after the list of potential matches has been calculated, the system calculates a Basic Compatibility Score at step 74 for each of the potential matches on the list of potential matches. After computing this basic score, an Adjusted Compatibility Score is calculated at step 75 for each potential match using a system of bonuses and penalties. The numerical index of desirability calculated by the matching program 3 is then compared against the matching threshold at step 76 to determine whether a potential match meets the basic level of compatibility to be matched with the user.

A. Basic Compatibility Score

Figure 5B:
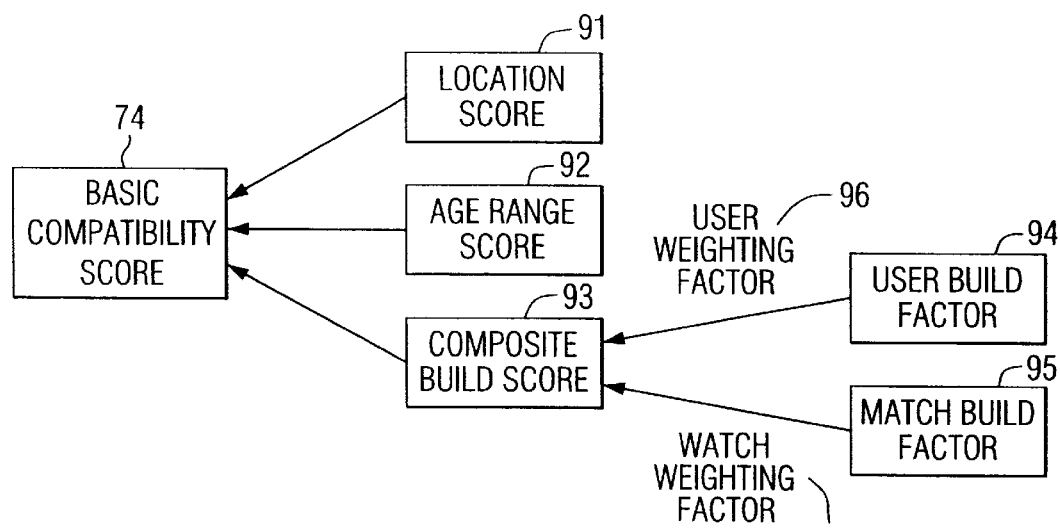
FIG. 5b is a schematic diagram of the factors used in calculating the basic compatibility score in the matching program.

FIG. 5b illustrates the factors used in calculating the Basic Compatibility Score. The Basic Compatibility Score for each potential match is created based on three criteria: the difference between the location of the residence of the user and the potential match 91, the difference between the potential match's age and the age desired by the user 92, and whether the potential match's build is that desired by the user 93. A person skilled in the art will recognize that other criteria may be used in computing the Basic Compatibility Score without deviating from the invention. Thus, for example, in a system for matching tenants with apartments, the Basic Compatibility Score could be based on the difference between the actual location and desired location, the difference between the actual and desired price, and whether the apartment has the correct number of bedrooms.

At step 91 of the embodiment shown in the drawings, the matching program 3 first examines the locations of the residences of both the user and the potential match as indicated by the value in the location_of_residence field 27 of the user's and potential match's trait profiles 17 respectively. These values then are used to cross-reference a location matrix (not shown) using the value indicated by the row corresponding to the user's location and the column indicated by the potential match's location. The values stored in the location matrix are customized for the geographic area served by the operator of the invention, and are based upon an evaluation of accessibility, convenience, and distance to commute between certain parts of the area. The value indicated by the intersection of the user's and potential match's location values in the location matrix preferably ranges from 0 to 60 points. A location matrix value over 20 preferably results in elimination of the potential match as being too inconvenient for the user and potential match to meet and form a relationship. Otherwise, the value indicated in the location matrix is converted to a score from 60 to 300 points using the following formula and is added to the Basic Compatibility Score:

$$300*(1-location\_matrix\_score*0.04)$$

The next calculation performed by the matching program 3 is to calculate an age range score at step 92. If the value in the age field 20 of the potential match's trait profile 17 is between the minimum_age 35 and maximum_age 34 specified in the user's preference profile 18, then the Basic Compatibility Score is increased by 300 points. Otherwise, the Basic Compatibility Score is reduced by the percentage that the potential match's age is outside the age range specified by the user and extended in step 82. This percentage reduction is computed according to the following formula:

$$300*(1-percent\_distance\_from\_boundary\_to\_extended\_boundary*0.2)$$

where percent_distance_from_boundary_to_extended_boundary is calculated as follows if the match is younger than the user's desired minimum age:

(user.minimum_age−match.age)/(user.minimum_age−user.minimum_age_extended) or by the following formula if the match is older than the user's maximum desired age:

(match.age−user.maximum_age)/(user.maximum_extended_age−user.maximum_age). The resulting score from 240 to 300 points is added to the Basic Compatibility Score.

The final process in computing the Basic Compatibility Score is to calculate a composite build score for the potential match at step 93. This score is based on a derivative variable called "build" which is based on a conversion of a profile's height and weight into a single variable using normative data. Build values are coded from 1 to 5 and correspond to small, medium, full, X-full, XX-full. The matching program 3 calculates the user's own build 46 by converting the value in the height 23 and weight field 22 of the user's trait profile 17 into a 1–5 build code using a matrix based on actuarial obesity tables. Using the same tables, the matching program 3 similarly calculates the potential match's own build 46 using the weight value 22 specified in the potential match's trait profile 17. A person skilled in the art will recognize that the ability of the invention to generate derivative variables has application outside the example illustrated in the preferred embodiment and can be used in other compatibility screening situations to increase the compatibility of matches. Thus, for example, a derivative variable called "health" could be calculated based on trait variables for age, weight, height, and whether_smoker and used to increase matches between candidates and nursing home facilities. Similarly, a derivative variable called "class" could be calculated based on zip code, age to increase compatible matches between home buyers and residential neighborhoods.

In the embodiment illustrated in the drawings, the composite build score is a weighted sum of how closely the potential match's actual build matches the user's desired build (referred to as the user's desired build factor 94), and how closely the user's build matches that desired by the potential match (known as the potential match's desired build factor 95) The user's desired build 94 and the potential match's desired build 95 are specified in the desired_build field 36 of the user's and potential match's respective preference profiles 18.

The matching program 3 computes the user's desired build factor 94 by first adjusting the user's desired build 36 according to the user's own build 46. This feature was designed to compensate for the fact that a person with a larger build will have a different view of what constitutes a small build than does a person who has a small build himself or herself. The user's desired build 36 is adjusted upward by 1 if the user's build 46 is X-full or upward by 2 if the user's build 46 is XX-full. The matching program 3 then compares the potential match's build 46 to the user's adjusted desired build. If the potential match's build is less than the user's adjusted desired build, then the user's desired build factor 94 is set to the maximum value of 1.0. If the potential match's actual build is greater than or equal to the adjusted desired build, then the user's build factor 94 is determined by the difference between the user's desired build 36 and the actual build 46 of the potential match with a difference of 0, 1, 2, 3, 4, and 5 corresponding to user build factors 94 of 1.0, 0.90, 0.26,−0.57, and −2.67 respectively.

After computing the user's desired build factor 94 representing the compatibility of the potential match's build 46 to that desired by the user 36, the matching program 3 goes on to calculate the corresponding potential match build factor 95 representing the compatibility of the user's build to that desired by the potential match. The potential match's desired build 36 is adjusted upward by 1 if the potential match's build 46 is X-full or upward by 2 if the potential match's build 46 is XX-full. The matching program 3 then compares the user's build 46 to the potential match's adjusted desired build. If the user's build 46 is less than the potential match's adjusted desired build, then the potential match's desired build factor 95 is set to the maximum value of 1.0. If the user's actual build 46 is greater than or equal to the adjusted desired build, then the potential match's build factor 95 is determined by the difference between the potential match's desired build 36 and the actual build of the user 46 with a difference of 0, 1, 2, 3, 4, and 5 corresponding to potential match build factors 95 of 1.0, 0.90, 0.26,−0.57, and −2.67 respectively.

The final build score 93 then is computed as a weighted sum of the user's and potential's match's build factors 94, 95 according to the following formula:

$$build\_score=400 * ((user\ weighting\_factor * user's\_build\_factor)+(match-weighting\_factor * potential\ match's\_build\_factor))$$

where in the preferred embodiment user_weighting_factor 96 is 0.7 and match_weighting_factor 97 is 0.3. The resulting composite build score 93 ranges between 35 and 400 points.

In the embodiment illustrated in the drawings, the Basic Compatibility Score is the sum of the scores calculated for the location score 91, age range score 92, arid composite build score 93. In another embodiment of the invention, the matching program 3 will weight these three scores before summing them based upon the ranking of importance assigned to the relevant characteristics by the user as stored in the preferences profile 18 (not shown). After computing the basic score, the matching program 3 goes on to compute an Adjusted Compatibility Score at step 75 based on the user's and potential match's profile records 16.

B. Adjusted Compatibility Score

Figure 5C:
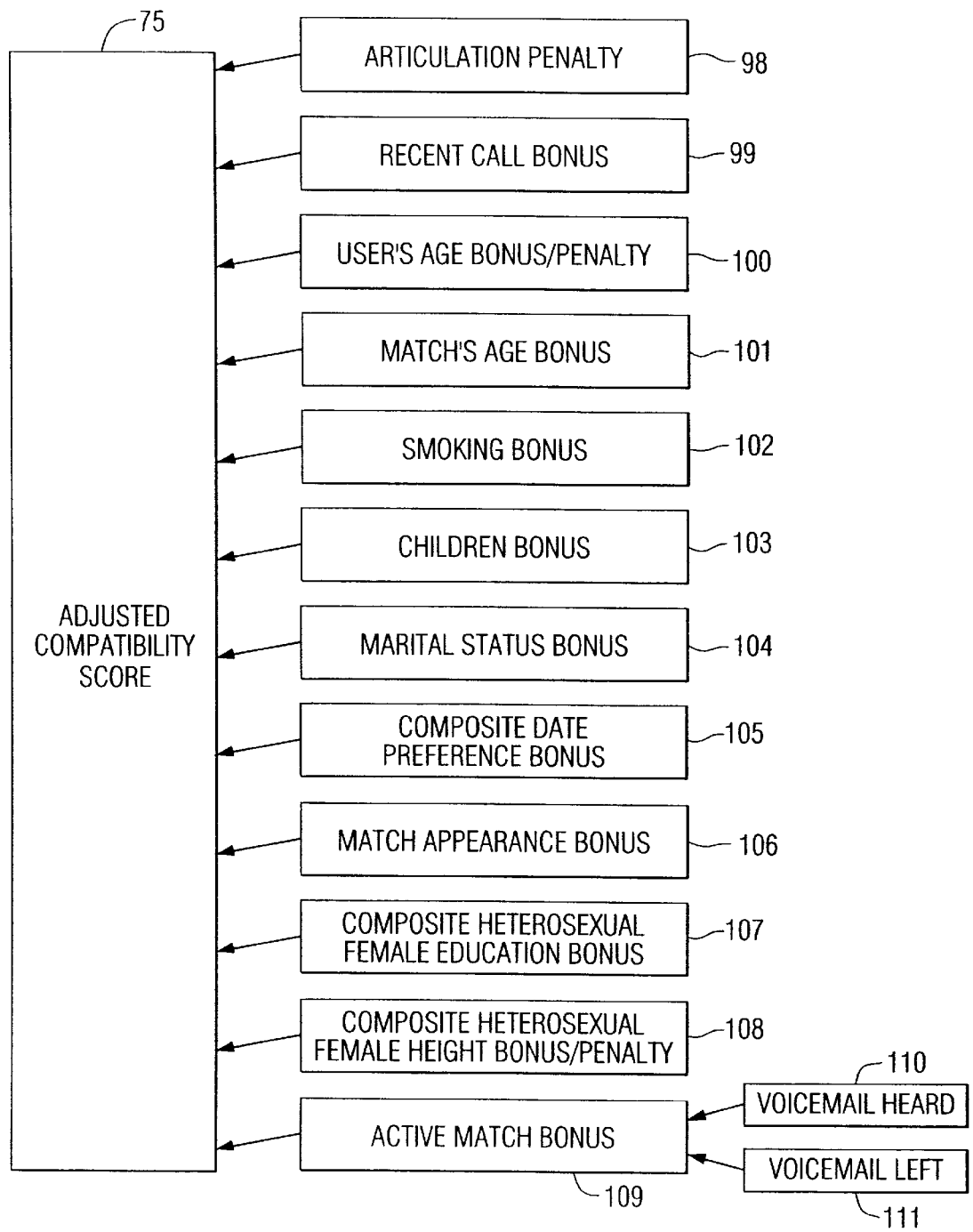
FIG. 5c is a schematic diagram of the bonuses and penalties used in calculating the adjusted compatibility score in the preferred embodiment of the matching program.

FIG. 5c illustrates the factors used in calculating the Adjusted Compatibility Score at step 75 of the preferred embodiment. The Adjusted Compatibility Score is set first to the Basic Compatibility Score, and then is increased or decreased according to the following series of bonuses and penalties:

(a) Articulation Penalty 98—The matching program 3 reduces the Adjusted Compatibility Score by 10 points if the value contained in the articulation field 45 in the potential match's system data 19 indicates that the outgoing message 15 of the potential match was "inarticulate."

(b) Recent Call Bonus 99—The matching program 3 increases the Adjusted Compatibility Score if the value in the days_since_last_call field 41 in the system data 19 of the potential match indicates the potential match has called the system within the last 4 days. Bonus points are awarded on a sliding scale according to the following formula:

$$24 * (4\ days\_since\_last\_call)$$

This bonus reflects the fact that a relationship is more likely to be formed with a potential match who frequently checks for matches and thus is considered more serious about finding a match.

(c) User's Age Bonus/Penalty 100—The matching program 3 then checks the age range specified by the potential match in the minimum_age 35 and maximum_age 34 of the potential match's preference profile 18. If the user's age, as specified in the age field 20 of the user's trait profile 17, is within the potential match's age range, then the Adjusted Compatibility Score is increased by 15 points. Otherwise, the Adjusted Compatibility Score is decreased by 24 points if the user's age is within 4 years of the potential match's age range or penalized 250 points if the user's age is more than 4 years outside of the potential match's age range.

(d) Match's Age Bonus 101—The matching program 3 increases the Adjusted Compatibility Score based on how close the potential match's age, as specified in the age field 20 of the potential match's trait profile 17, is to the user's desired average age. The user's_desired_average_age is determined as the mathematical mean average of the maximum_age 35 and minimum_age 34 specified in the user's preference profile 18. The number of bonus points awarded is calculated according to the following formula:

$$\%\_distance\_from\_boundary\_to\_mean * 31.2$$

where %_distance_from_boundary_to_mean is calculated as follows if the match is younger than the user's desired average age:

$$(match.age - user.minimum\_age)/(user's\_desired\_average\_age - user.minimum\_age)$$

or calculated by the following formula if the match is older than the user's average desired age:

$$(user.maximum\_age - match.age)/(user's\_desired\_average\_age - user.minimum\_age)$$

A maximum of 31.2 bonus points can be awarded.

(e) Smoking Bonus 102—The matching program 3 increases the Adjusted Compatibility Score by 14 points if the smoking_preference 39 indicated in the user's preference profile 18 is "non-smoker_will_date_smoker" and the whether_smoker field 30 of the potential matches' trait profile 17 indicates the potential match is actually a "non-smoker." Thus, while the user may have indicated that they will accept a match with a smoker, the Adjusted Compatibility Score is given a bonus if the potential match is actually a non-smoker.

(f) Children Bonus 103—The matching program 3 increases the Adjusted Compatibility Score by 14 points if the children_preference 38 indicated in the user's preference profile 18 is "prefer_no_children" and the whether_have_children field 24 of the potential matches' trait profile 17 indicates the potential match actually has "no_children." Thus, while the user may have indicated that they will accept a match with a potential match who has children, the Adjusted Compatibility Score is given a bonus if the potential match does not actually have children.

(g) Marital Status Bonus 104—The matching program 3 increases the Adjusted Compatibility Score by 6 points if the marital_status field 26 of the potential match's trait profile 17 indicates that the potential match is single.

(h) Composite Date Preference Bonus 105—The matching program 3 increases the Adjusted Compatibility Score by 6 points if the type_of_activity_liked field 31 of the user's trait profile 17 matches the type_of_activity_liked field 31 of the potential match's trait profile 17.

(i) Match Appearance Bonus 106—The matching program 3 increases the Adjusted Compatibility Score by 3 points if the whether_good_looking field 28 of the potential match's trait profile 17 indicates that the potential match considers himself or herself good looking.

(j) Composite Heterosexual Female Education Bonus 107—The matching program 3 next checks whether the user is a female seeking to match with a male, as specified in the sexual_preference field 33 of the user's preference profile 18. If this is the case, the matching program 3 increases the Adjusted Compatibility Score by 13.2 points if the education_level 29 indicated in the potential match's trait profile 17 is greater than that indicated in the female user's trait profile 17. This compatibility score adjustment represents a behavioral science finding that heterosexual women place a premium on dating educated men.

(k) Composite Heterosexual Female Height Bonus/Penalty 108—If the user is a heterosexual female as indicated above, the matching program 3 also will compute a bonus or penalty based on the height differential between the female user and a potential male match as indicated by the difference between the values in the height fields 23 of the user's and potential match's respective trait profiles 17. The Adjusted Compatibility Score is increased by 60 points if the potential male match is more than 2 inches taller than the female user. If the male potential match is less than 2 inches taller than the female user, the Adjusted Compatibility Score is increased by 30 points times the difference in height between the user and the potential match. If the male potential match is shorter than the user, the adjusted compatibility score is decreased by 30 points times the difference in height between the user and potential match. If the male potential match is more than 3 inches shorter than the female user then the Adjusted Compatibility Score is penalized by 500 points. This compatibility score adjustment represents a behavioral science finding that heterosexual women place a premium on dating taller men and do not wish to date men that are much shorter.

(I) Active Match Bonus 109—The matching program 3 increases the Adjusted Compatibility Score if the potential match is an active user who sends voicemail messages to persons with whom they have been matched. Based on the number of voicemail messages the potential match has previously left as indicated in the number_voicemail_messages_left field 43 of the potential match's system data 19, the adjusted compatibility score is increased by 2 times the number of messages left up to a maximum of 35 points. The matching program 3 also increases the Adjusted Compatibility Score if the potential match is an active user who, in addition to leaving voicemail messages, has also been active in listening to the voicemail messages he or she receives from matches. Based on the number of voicemail messages the potential match has previously listened to, as indicated in the number_voicemail_messages_heard field 44 of the potential match's system data 19, the Adjusted Compatibility Score is increased by the number of messages heard up to a maximum of 35 points both of these adjustments increase the compatibility score for the match to reflect the fact that the potential match has been actively seeking and replying to other matches and is therefore likely to follow up on any match that is received.

In one embodiment of the invention, before including the bonuses and penalties listed in (a)–(I) in the Adjusted Compatibility Score, the matching program 3 will weight the bonuses and penalties based upon how important the user has ranked the corresponding preferences (as stored in the preferences profile 18) (not shown). It will be recognized by one skilled in the art that other bonuses and penalties can be utilized in other situations without deviating from the invention. For example, in a compatibility matching system for tenants and apartments, an apartment may satisfy the constraint criteria and constitute a potential match if the preference profile 18 for the tenant indicates "in_unit_laundry_preferred," but a bonus would be awarded if the trait profile 17 of the apartment indicates that the apartment actually has in-unit laundry facilities.

After computing the Adjusted Compatibility Score between the user and potential match as indicated above, the matching program 3 checks this adjusted score against a minimum matching threshold at step 76. In the preferred embodiment this threshold is set at 900 points, however the threshold can be decreased if an adequate number of matches is not being generated. If the Adjusted Compatibility Score is greater than this minimum threshold, then the potential match is considered an acceptable match and is added to a list of acceptable matches at step 77. If the Adjusted Compatibility Score does not reach the minimum threshold, the matching program 3 may still add the potential match to the list of acceptable matches if the adjusted Compatibility Score is more than 825 and the Basic Compatibility Score met the minimum threshold of 900. In such a case, the potential match is considered a barely acceptable match and the Adjusted Compatibility Score is set to one more point than the minimum threshold and the potential match is added to the list of acceptable matches at step 77.

In one embodiment, an acceptable match who has more than 3 unheard voicemail messages within a 48 hour period, as indicated by the matches linked to the potential match's system data 19, is no longer eligible to be used as a match and is thus removed from the list of acceptable matches.

After the matching program 3 has generated the list of acceptable matches by determining at step 78 that all potential matches have had a compatibility score calculated and checked against the threshold, the matching program 3 sorts at step 79 the list of acceptable matches from highest to lowest Adjusted Compatibility Scores and discards all but the top 10 potential matches with the highest Adjusted Compatibility Scores at step 80. For these remaining 10 acceptable matches, the matching program 3 goes back to compute a Basic Compatibility Score and Adjusted Compatibility Score from the potential match's point of view (not shown). That is, the matching program 3 will recompute the Basic Compatibility Score as well as the Adjusted Compatibility Score using the acceptable match as the user and using the user as the acceptable match. The resulting compatibility scores provides a numerical measure of the compatibility of the user and match from the match's point of view and indicates how desirable the match would find the user under the same criteria. The reverse Basic and Adjusted Compatibility Scores are stored in the match record 50 (not shown). These reverse scores can be used to further refine the matching process and increase the compatibility of the matches generated by the matching program 3, for example, by combining the user's and potential match's compatibility scores into a single composite compatibility score using a weighted average and then providing only the highest composite scores to the user or by eliminating potential matches whose reverse compatibility score does not reach a certain threshold.

The matching program 3 determines how many matches should be inserted into the user's mailbox using a randomization routine to insure that the user does not always receive the same number of matches upon each call. In the preferred embodiment, the number of matches provided to the user ranges between a maximum of 5 and 7 and changes daily. Beginning at the top of the list with the acceptable match with the highest Adjusted Compatibility Score, the matching program 3 inserts the date of the match and the mailbox number of the potential match into the matches area 50 of the user's system data 19. After inserting the matches, the program then updates the user's status 40 as having received matches and goes on at step 81 to calculate the potential matches for the next user.

III. Match Retrieval System

Figure 6:
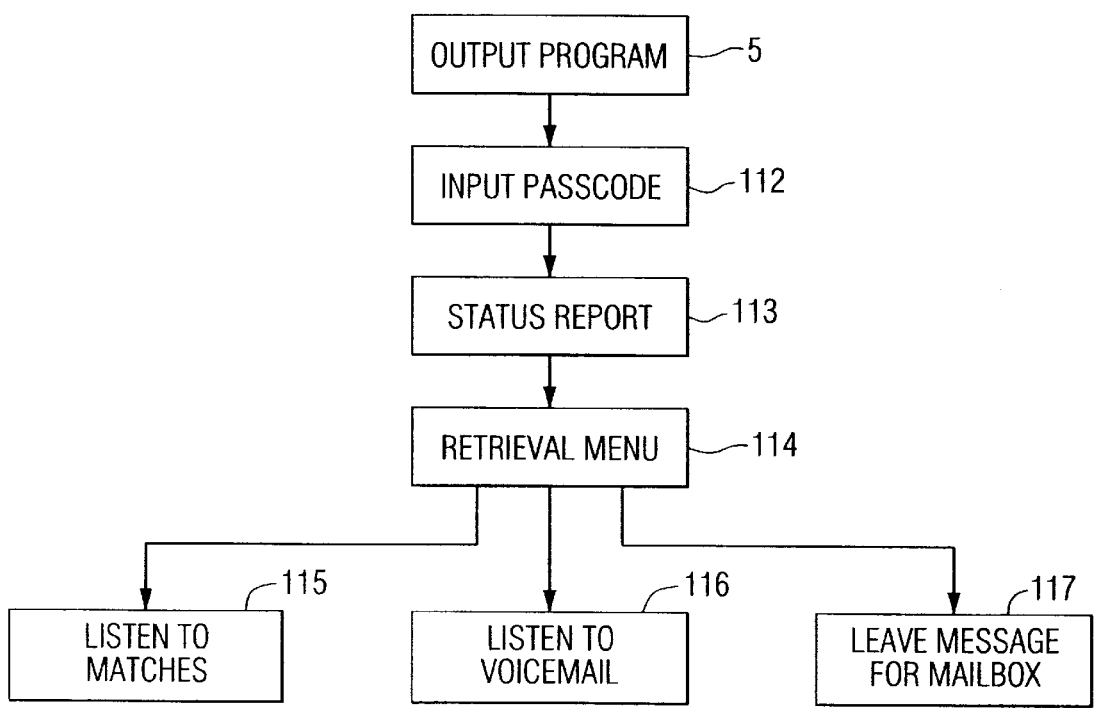
FIG. 6 is a functional diagram of the output program of the preferred embodiment of the invention.

FIG. 6 is a functional diagram of the output program 5 that permits a user to retrieve the matches generated for the user by the matching program 3. In the preferred embodiment of the invention, the user access 6 to this output system 13 is accomplished through a telecommunications system which is connected to a telephone line and accessed through the use of a touch-tone telephone. However, it will be readily understood by those skilled in the art that the invention and user access is not so limited and instead the output of the system 13 could be directed to a video display with choices made by a keyboard instead of by a touch-tone telephone keypad. In the preferred embodiment, the user accesses the output program 5 by dialing a telephone number associated with the invention. Upon being connected to the system, the user is asked to enter his or her passcode 42 at step 112. Upon verification of the passcode, the system informs the user at step 113 of the number of potential matches that have been generated by the matching program 3 and also notifies them of any voicemail messages that they have received as a result of being used as a match for another user.

Using the output means 13 at step 114, such as a series of pre-recorded prompts in the preferred embodiment, the user is asked to indicate whether they desire to listen to their matches, to listen to their incoming messages from others for whom they have been used as a match, or to leave a message for a specific user.

If the user selects that they desire to listen to the matches that they have received, the system at step 115 sequentially moves through the matches generated for the user by the matching program 3. For each match, the output program 5 reads the characteristics stored in the fields (20–32) of the match's trait profile 17. In the preferred embodiment this is accomplished by using a series of digitally recorded prompts with specific messages associated with each of the codes entered in the trait profile 17. After the potential match's profile has been played, the user is presented with the option to listen to the match's outgoing message 15 by pressing a touch-tone key either to re-listen to the match's personality profile or to skip the match and mark the match heard in the system data 19 of the user's profile record 16 (not shown). If the user chooses to listen to the match's outgoing message 15, the output program 5 plays the outgoing message 15 associated with the profile record 16 of the match. After that message is played, the user is presented with the option to leave a voicemail message 51 for the match. If the user chooses to record a voicemail message 51 to the match then that message will be linked to the profile record 16 of the match and the match will be notified that a voicemail message has been received the next time that the match contacts the output program 5. For each voicemail message that the user records the value in the field number_voicemail_messages_left 43 in the system data 19 of the user's profile record 16 is incremented by one. When the user has finished listening and responding to the match, the output program 5 proceeds to the next match generated by the matching program 3 and repeats the same process for the remaining matches associated with the user's profile record 16.

If the user decides to listen to incoming voicemail messages 51 that are received from other persons for whom the user has been used as a match, the output program 5 at step 116 cycles through each of the voicemail messages left for the user. For each voicemail message 51 listened to by the user the value in the field number_voicemail_messages_heard 44 in the system data 19 of the user's profile record 16 is incremented by one. After listening to each message, the user is presented with an option to advance to the next message, or listen to the outgoing message 15 or trait profile 17 of the person from whom they have received the voicemail 51 (not shown). When the user has finished listening to the voicemail, the output program 5 proceeds to the next voicemail and repeats the same process for the remaining voicemails 51 associated with the user's profile record 16.

If the user desires to leave a message for a specific user, such as a person from whom they have received voicemail, they are prompted at step 117 to enter the mailbox number 14 of the person for whom they wish to leave a message. They are then presented with the option to listen to that person's trait profile 17, to hear that person's outgoing message 15, or to leave a voicemail message 51 for that person. After the user has recorded a voicemail message for the person whom they have specified, they are permitted the opportunity to re-record or erase the message that they have just recorded (not shown). For each voicemail message that the user records the value in the field number_voicemail_messages_left 43 in the system data 19 of the user's profile record 16 is incremented by one.

As already noted, the principles outlined in regard to the embodiment of the invention described in the text above can be applied to different sets of demographic/psychographic data to match potential employees with jobs (relying upon user and employer preference criteria such as work experience, skills, education, geographic preferences, company size, career track, etc.), candidates with residency positions, tenants with apartments, buyers with homes, and the like. Those skilled in the art will understand the ready transferability of the invention's technology, applied in the dating area, to such other matching applications. The artificial intelligence used in the invention in such applications will, of course, be based upon known or measured relationships from demographic or other studies. For example, in the case of an home finding service, information about geographic areas near to the user's preference may, be included in the output, as well as information about more remote geographic areas with similar housing stock.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A method for using a computer processor to select and match profiles comprised of a set of predetermined traits and preferences,
   collecting information collecting information about the relevant traits of each profile;
   collecting information about the preferences for each profile;
   comparing selected preferences in each profile with the traits of each other profile in a database of profiles to eliminate incompatible profiles;
   calculating a compatibility score for each remaining compared profile based on a comparison of selected preferences in each profile with the traits of each other profile to identify a plurality of matched profiles;
   sorting the matched profiles according to the compatibility score;
   reporting the matched profiles.

2. The method of claim 1, further comprising the steps of establishing a minimum threshold for the compatibility score and reporting only those matched profiles achieving the minimum threshold.

3. The method of claim 1, further comprising the step of varying a preference of a profile based upon the traits of past matched profiles.

4. The method of claim 1, further comprising the step of adjusting the compatibility score based on the traits of past matched profiles.

5. The method of claim 1, further comprising the step of varying a preference of a profile based upon normative data associated with selected traits correlated to that preference.

6. The method of claim 1, further comprising the step of increasing the compatibility score when a profile contains a preference for a certain trait but does not require that trait in a potential match, and the potential match possesses the certain trait.

7. The method of claim 1, wherein the steps of collecting information are performed by entering the information using a touch-tone telephone keypad in response to audible prompts.

8. The method of claim 1, further comprising the steps of:
ranking the importance of selected preferences in each profile;
collecting information about the rank of each such preference;
adjusting the compatibility score by weighting comparisons to a preference by a factor correlating to the ranking of importance assigned to such preference.

9. A method for using a computer processor to match two users based on their personal traits and preferences, comprising the steps of:
collecting information about the relevant traits of a user;
collecting information about the preferences the user desires in a match;
comparing selected preferences and traits of the user and other users to determine potential matches;
calculating a compatibility score for each potential match based on a comparison of selected preferences of the user with traits of the potential match and the preferences of the potential match with traits of the user to identify a plurality of matched profiles;
sorting the matched profiles according to the compatibility score;
reporting the highest scoring matched profiles to the user; and
permitting the user to access information regarding selected personal traits of the matched profiles.

10. The method of claim 9, further comprising the steps of establishing a minimum threshold for the compatibility score and reporting only those matched profiles achieving the minimum threshold.

11. The method of claim 9, further comprising the step of varying a preference of the user based upon the traits of past matched profiles.

12. The method of claim 9, further comprising the step of adjusting the compatibility score based on the traits of past matched profiles.

13. The method of claim 9, further comprising the step of increasing the compatibility score if the user indicates a preference for a certain trait but does not require that trait in a potential match, and the potential match possesses the certain trait.

14. The method of claim 9, further comprising the step of generating an additional trait for a user based upon selected traits of that user and normative data correlated to those selected traits.

15. The method of claim 14 wherein the selected traits are weight and height which are used to generate additional traits representing the user's build based on normative build data.

16. The method of claim 9, further comprising the step of varying a preference of the user based upon normative data associated with selected traits correlated to that preference.

17. The method of claim 16 wherein the preferences varied are the minimum and maximum age of a potential match and those preferences are relaxed by a factor correlated to the percentage of the user's age trait based upon normative data.

18. The method of claim 16 wherein the preference varied is the build desired in a potential match which is adjusted upward by a factor correlated to the user's build based upon normative data.

19. The method of claim 9, further comprising the step of increasing the compatibility score if the potential match is an active user of the system and thereby is likely to respond if a match is made.

20. The method of claim 9, further comprising the steps of:
ranking the importance of selected preferences of the user;
collecting information about the rank the user assigns to each such preference;
adjusting the compatibility score by weighting comparisons to a preference by a factor correlating to the ranking of importance assigned to such preference.

21. The method of claim 9 wherein the steps of collecting information are performed by having a user enter the information using a touch-tone telephone keypad in response to audible prompts.

22. The method of claim 9 further comprising the step of permitting the user to contact the potential matches.

23. A system to select and match profiles comprised of a set of predetermined traits and preferences, comprising:
computer processor means for processing data;
first means for collecting information about the relevant traits for each profile;
second means for collecting information about the preferences of each profile;
third means for comparing selected preferences in each profile with traits of each other profile in a database of profiles to eliminate incompatible profiles;
fourth means for calculating a compatibility score for each remaining compared profile based on a comparison of selected preferences in each profile with the traits of each other profile to identify a plurality of matched profiles;
fifth means for sorting the matched profiles according to the compatibility score; and
sixth means for reporting the matched profiles.

24. A system for selecting and matching two users of the system based on their personal traits and preferences, comprising:
computer processor means for processing data;
first means for collecting information about the relevant traits of a user;
second means for collection information about the preferences the user desires to match;
third means for comparing selected preferences and traits of the user and other users of the system to determine potential matches;
fourth means for calculating a compatibility score for each potential match based on a comparison of selected preferences of the user with the traits of the potential match and the preferences of the potential match with the traits of the user to identify a plurality of matched profiles;
fifth means for sorting the matched profiles according to the compatibility score; and
sixth means for reporting the highest scoring matched profiles to the user.

25. The system of claim 24 further comprising seventh means for permitting the user to contact the potential matches through the system.

* * * * *

(12) EX PARTE REEXAMINATION CERTIFICATE (8069th)

United States Patent
Durand et al.

(10) Number: US 6,272,467 C1
(45) Certificate Issued: Mar. 8, 2011

(54) SYSTEM FOR DATA COLLECTION AND MATCHING COMPATIBLE PROFILES

(75) Inventors: Pierre E. Durand, Chicago, IL (US); Michael D. Low, Evanston, IL (US); Melissa K. Stoller, Kenilworth, IL (US)

(73) Assignee: Spark Network Services, Inc., Evanston, IL (US)

Reexamination Request:
No. 90/008,935, Nov. 20, 2007

Reexamination Certificate for:
Patent No.: 6,272,467
Issued: Aug. 7, 2001
Appl. No.: 08/784,713
Filed: Jan. 16, 1997

Related U.S. Application Data
(60) Provisional application No. 60/024,789, filed on Sep. 9, 1996.

(51) Int. Cl.
*G06F 17/30* (2006.01)
*G06Q 30/00* (2006.01)

(52) U.S. Cl. .............................................. 705/5; 705/56
(58) Field of Classification Search ...................... 705/1, 705/5, 26
See application file for complete search history.

(56) References Cited

U.S. PATENT DOCUMENTS

| | | |
|---|---|---|
| 4,173,016 A | 10/1979 | Dickson |
| 4,348,740 A | 9/1982 | White |
| 5,109,789 A | 5/1992 | Berman |
| 5,136,501 A | 8/1992 | Silverman et al. |
| 5,210,868 A | 5/1993 | Shimada et al. |
| 5,459,859 A | 10/1995 | Senda |
| 5,495,412 A | 2/1996 | Thiessen |
| 5,592,375 A | 1/1997 | Salmon ...................... 395/207 |
| 5,659,731 A | 8/1997 | Gustafson .................... 395/604 |
| 5,664,115 A | 9/1997 | Fraser |
| 5,681,046 A | 10/1997 | Lawrence |
| 5,835,087 A | 11/1998 | Herz et al. |
| 5,884,272 A | 3/1999 | Walker et al. |
| 5,924,082 A | 7/1999 | Silverman ..................... 705/37 |
| 5,926,801 A | 7/1999 | Matsubara et al. |
| 5,950,177 A | 9/1999 | Lupien et al. |
| 6,098,051 A | 8/2000 | Lupien et al. |
| 6,260,025 B1 | 7/2001 | Silverman et al. |
| 6,519,574 B1 | 2/2003 | Wilton et al. |
| 7,225,150 B2 | 5/2007 | Wilton et al. |
| 2005/0086211 A1 | 4/2005 | Mayer |

OTHER PUBLICATIONS http://www.archive.org/web/web.php ("The Wayback Machine"), pp. 1–8, last visited Oct. 14, 2008.
http://web.archive.org/web/*/http://www.computer-dating.com, pp. 1–4, last visited Oct. 14, 2008.
http://web.archive.org/web/19961122183233/http://computer-dating.com/, last visited Oct. 14, 2008.
http://web.archive.org/web/19961122183258/computer-dating.com/female.shtml, pp. 1–4, last visited Oct. 14, 2008.

(Continued)

*Primary Examiner*—Majid A. Banankhah

(57) ABSTRACT

This invention relates to an automated method for identifying matches between a set of predetermined traits and a set of preferences. This method can be used to find compatible matches in a variety of situations where participants are identified by a profile of traits and a set of criteria desired in at match, including, for example, matching candidates to residency program, and matching job hunters with employment opportunities. The present invention offers advantages and improvements over prior computer matching systems because, it provides an automated, effective method for matching traits with corresponding preferences and insures that only matches of the highest degree are made. The, present invention utilizes two-way matching of selected criteria, which measures not only how compatible the potential match is with the desired traits of the user, but also how well the user fits the potential match's idea of the perfect match.

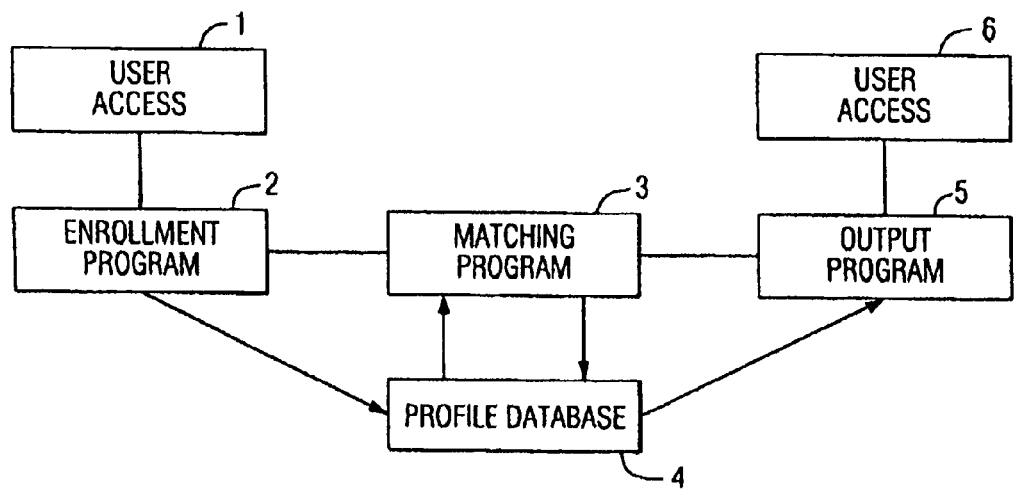

OTHER PUBLICATIONS http://web.archive.org/web/19961122183345/computer-dating.com/samplef.shtml, pp. 1–2, last visited Oct. 14, 2008.

Memo of Chris L. Bolinger, "Plextel Invention Dates in Patent Application," dated Aug. 6, 1996.

Memo of Chris L. Bolinger, "Patent Application," dated Aug. 6, 1996.

Answer, Affirmative Defenses, and Counterclaims of Defendant eHarmony.com to Complaint of Plaintiff Spark Network Services, Inc., Mar. 23, 2007, *Spark Network Services, Inc.* v. *Match.com, LP et al.*, N.D. ill, Case No. 1:07–CV–00570.

Defendant Match.com, L.P.'s Answer, Counterclaim, and Jury Demand, Mar. 23, 2007, *Spark Network Services, Inc.* v. *Match.com, LP et al.*, N.D. ill, Case No. 1:07–CV–00570.

Joint Rule 26(a)(I) Disclosure, Apr. 18, 2007, *Spark Network Services, Inc.* v. *Match.com, LP et al.*, N.D. ill, Case No. 1:07–CV–00570.

Plaintiff, Spark Network Services, Inc.'s Responses to Defendant Match.com's First Set of Interrogatories Nos. 1–11, May 14, 2007, *Spark Network Services, Inc.* v. *Match.com, LP et al.*, N.D. ill, Case No. 1:07–CV–00570.

Responses to eHarmony's First Set of Interrogatories (Nos. 1–16), May 14, 2007, *Spark Network Services, Inc.* v. *Match.com, LP et al.*, N.D. ill, Case No. 1:07–CV–00570.

Responses to Yahoo's First set of Interrogatories (Nos. 1–17), May 14, 2007, *Spark Network Services, Inc.* v. *Match.com, LP et al.*, N.D. ill, Case No. 1:07–CV–00570.

eHarmony.com's Responses and Objections to Plaintiff's First Set of Interrogatories, Jul. 2, 2007, *Spark Network Services, Inc.* v. *Match.com, LP et al.*, N.D. ill, Case No. 1:07–CV–00570.

Defendant Match.com, L.P.'s Objections and Answers to Plaintiff's First Set of Interrogatories, Jul. 2, 2007, *Spark Network Services, Inc.* v. *Match.com, LP et al.*, N.D. ill, Case No. 1:07–CV–00570.

Yahoo's Response to Plaintiff's First Set of Interrogatories (1–7[20]) to Yahoo!, Jul. 7, 2007, *Spark Network Services, Inc.* v. *Match.com, LP et al.*, N.D. ill, Case No. 1:07–CV–00570.

Supplemental Responses to Yahoo's First Set of Interrogatories (Nos. 1, 5, 6, 8 and 10–14), Jul. 25, 2007, *Spark Network Services, Inc.* v. *Match.com, LP et al.*, N.D. ill, Case No. 1:07–CV–00570.

Defendant Various, Inc.'s Answer and Counterclaim to Plaintiff's Amended Complaint, Jan. 22, 2008, *Spark Network Services, Inc.* v. *Match.com, LP et al.*, N.D. ill, Case No. 1:07–CV–00570.

Answer of Spark Networks, Inc., Jan. 25, 2008, *Spark Network Services, Inc.* v. *Match.com, LP et al.*, N.D. ill, Case No. 1:07–CV–00570.

Plaintiff's Second Amended Complaint, *TrueBegginings, LLC* v. *Spark Network Services, Inc., et al.*, May 15, 2008, N.D. Tex., Case No. 3:07–CV–1986–M.

CBC Digital Archives, radio clip entitled "Computer Matchmaker", Jul. 17, 1957.

Emily Strong, et al., "Three–Filter Date Selection by Computer—Evaluation of Dating Partners Selected as Similar, Complementary, or at Random", The Family Coordinator, Apr. 1969.

Elizabeth Sanger, "Mating by Computer—A New Service Seeks to Match Investors with Ventures"—Barrons, Sep. 3, 1984, p. 32.

http://www.computer-dating.com/samplef.shtml—"Sample List of Most Compatible Guys", Oct. 18, 1995.

Mayer Computer Services, The Internet Computer Dating Service, Nov. 10, 2005.

Bunting, Jillian M., "Harvard Computer Society Plays Cupid", The Harvard Crimson, Feb. 9, 2007.

Computer Matchmaking Service—Matchmate, Inc.—May 31, 2007.

Letter to Yaron Mayer from Bradley J. Olson, Jan. 10, 2006.

Letter to Yaron Mayer from Bradley J. Olson, Jan. 14, 2006.

Letter from Raymond J. Niro, Jr., to Herb Vest, Nov. 14, 2007.

Caruso, Denise: In the Quest to sort through a sea of web data, a sudden Flash of light, The New York Times, Jan. 29, 1996, p. 3.

"Virgin–Net Teams With Broadvision to Deliver Personalized Services on New Virgin Online Services", Business Wire, May 14, 1996.

Useem, Jerry: Web on the Fly, Inc., vol. 18, Issue 4, pp. 20, 1996.

Alexander I. Zelitchenko, "Information Retrieval Expert System 'Matchmaker,'" Computers in Human Behavior, vol. 8 (pp. 281–296), 1992.

Operation Match Questionnaire, Compatibility Research, Inc., 1966.

Bradford W. Scharlott, "Overcoming Relationship–Initiation Barriers: The Impact of a Computer–Dating System on Sex Role, Shyness, and Appearance Inhibitions," Computers in Human Behavior, vol. 11, No. 2 (pp. 191–204), 1995.

Cheryl A. Meyer, "The Computer Personals: Meeting Your Match Online," Link Up: Communications and the Small Computer, vol. 1, No. 10 (pp. 38–40), Jul. 1984.

Robert H. Coombs and William F. Kenkel, "Sex Differences in Dating Aspirations and Satisfaction with Computer–Selected Partners," Journal of Marriage and the Family (pp. 62–66), Feb. 1966.

James P. Curran, "Differential Effects of Stated Preferences and Questionnaire Role Performance on Inter–personal Attraction in the Dating Situation," Journal of Psychology (pp. 313–327), 1972.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 and 16-25 are cancelled.
Claim 15 was not reexamined.

* * * * *